United States Patent [19]

Sakai et al.

[11] Patent Number: 5,075,882
[45] Date of Patent: Dec. 24, 1991

[54] NORMALIZING CIRCUIT OF FLOATING-POINT ARITHMETIC CIRCUIT FOR TWO INPUT DATA

[75] Inventors: Noriaki Sakai, Tokyo; Hiroyuki Arii, Yamanashi, both of Japan

[73] Assignee: NEC Corporation, Tokyo, Japan

[21] Appl. No.: 552,049

[22] Filed: Jul. 13, 1990

[30] Foreign Application Priority Data

Jul. 14, 1989 [JP] Japan .................................. 1-180514

[51] Int. Cl.[5] .............................................. G06F 7/38
[52] U.S. Cl. .................................................. 364/748
[58] Field of Search ................ 364/748, 715.04, 715.03

[56] References Cited

U.S. PATENT DOCUMENTS

| 4,758,974 | 7/1988 | Fields et al. | 364/748 |
| 4,905,178 | 2/1990 | Mor et al. | 364/748 |
| 4,926,369 | 5/1991 | Hokenek et al. | 364/748 |

*Primary Examiner*—Gary V. Harkcom
*Assistant Examiner*—Long T. Nguyen
*Attorney, Agent, or Firm*—Sughrue, Mion, Zinn, Macpeak & Seas

[57] ABSTRACT

A post-normalizing unit for use in a floating-point arithmetic circuit having a pre-normalizing unit for carrying out a pre-normalization operation on first and second exponent parts and first and second fraction parts to produce a maximum exponent part and first and second pre-normalized fraction parts, an arithmetic unit for carrying out an arithmetic operation on the first and the second pre-normalized fraction parts to produce an operated fraction part, and first and second shift count calculating circuits calculate first and second shift counts for use in normalizing the operated fraction part with an input cardinal number regarded as first and second cardinal numbers, respectively. Supplied with the operated fraction part, first and second shifters left-shift the operated fraction part on the basis of the first and the second shift counts to produce first and second shifted fraction parts, respectively. Supplied with the maximum exponent part, first and second exponent adjusting circuits adjust the maximum exponent part by using the first and the second shift counts to produce first and second adjusted exponent parts, respectively. A result selector selects one of the first and the second shifted fraction parts as a post-normalized fraction part. An exponent adjustment selector selects one of the first and the second adjusted exponent part as a post-normalized exponent part.

2 Claims, 9 Drawing Sheets

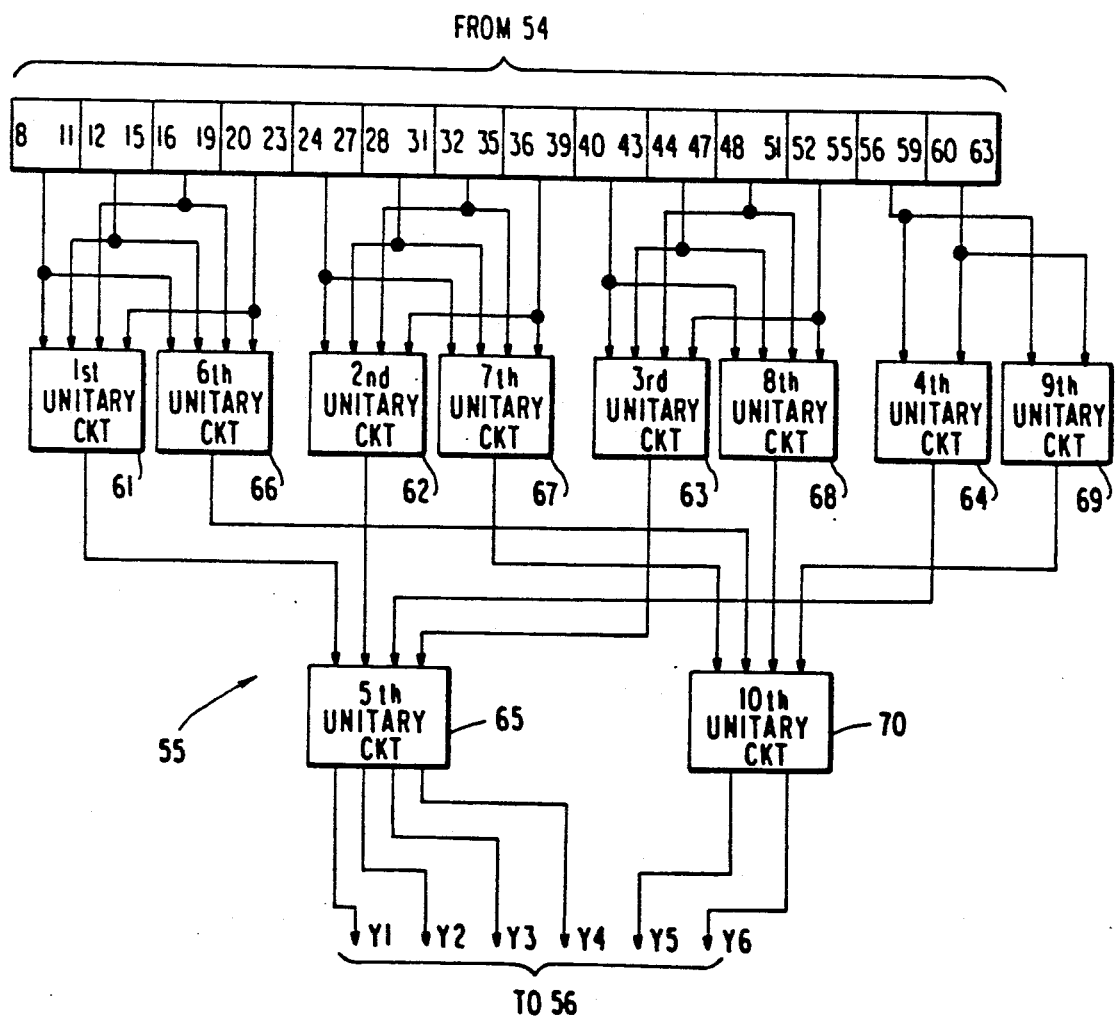

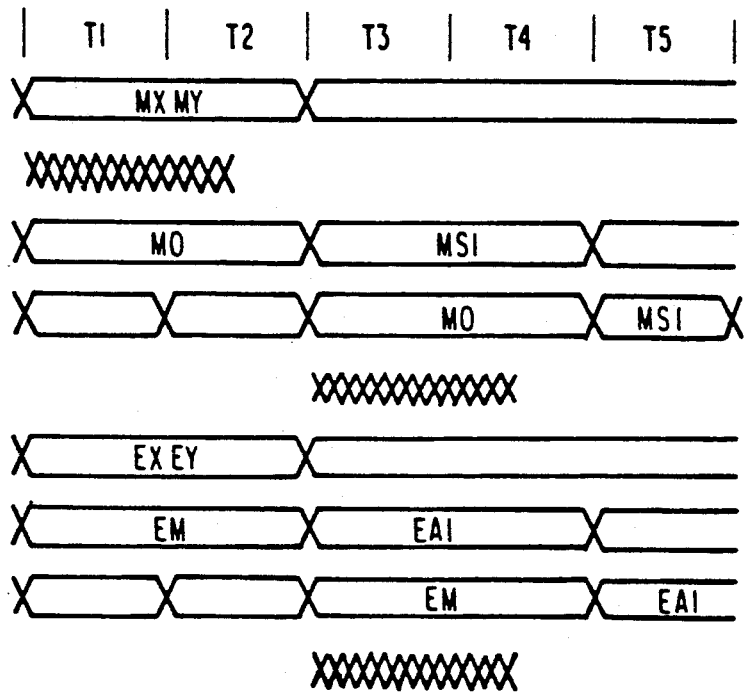
FIG. 10
FIG. 11
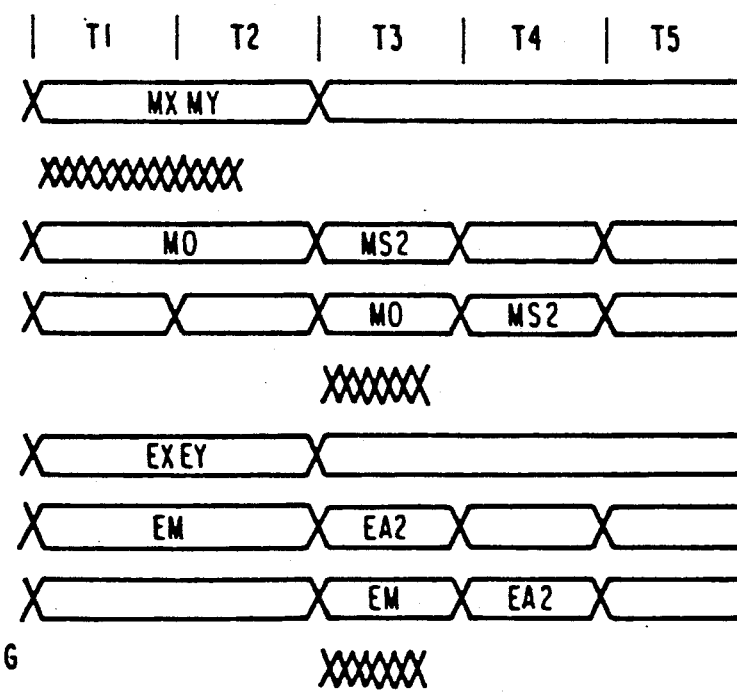

NORMALIZING CIRCUIT OF FLOATING-POINT ARITHMETIC CIRCUIT FOR TWO INPUT DATA

BACKGROUND OF THE INVENTION:

This invention relates to a floating-point arithmetic circuit for performing floating-point arithmetic of first and second input data, each of which is represented by a floating-point representation.

A floating-point arithmetic circuit of the type described is used in performing floating-point arithmetic of first and second input data. Each of the first and the second input data is represented by a floating-point representation. The first and the second input data are composed of first and second exponent parts and first and second fraction parts. Each of the first and the second exponent parts is represented by an exponent number to power of an input cardinal number. The floating-point arithmetic circuit comprises a pre-normalizing unit, an arithmetic unit, and a post-normalizing unit. The pre-normalizing unit is supplied with the first and the second exponent parts and the first and the second fraction parts. The pre-normalizing unit carries out a pre-normalization operation on the first and the second exponent parts and the first and the second fraction parts to produce a maximum exponent part and first and second pre-normalized fraction parts. The maximum exponent part indicates a maximum of the first and the second exponent parts. The first pre-normalized fraction part is one of the first and the second fraction parts that corresponds to the maximum exponent part. The second pre-normalized fraction part is the other of the first and the second fraction parts which is given by a shift equal to an absolute value of a difference between the first and the second exponent parts. The arithmetic unit is supplied with the first and the second pre-normalized fraction parts. The arithmetic unit carries out an arithmetic operation on the first and the second pre-normalized fraction parts to produce an operated fraction part. The post-normalizing unit is supplied with the maximum exponent part and the operated fraction part. The post-normalizing unit carries out a post-normalization operation to produce a post-normalized exponent part and a post-normalized fraction part.

According to prior art, the input cardinal number is a predetermined cardinal number, for example, equal to two. The post-normalizing unit comprises a shift count calculating circuit, a shifter, and an adjusting circuit. The shift count calculating circuit is supplied with the operated fraction part for calculating a shift count for use in normalizing the operated fraction part. The shifter is connected to the shift count calculating circuit and supplied with the operated fraction part. The shifter left-shifts the operated fraction part on the basis of the shift count to produce a shifted fraction part as the post-normalized fraction part. That is, the operated fraction part consists of a plurality of bits arranged from a most significant bit to a least significant bit. The shifter shifts the operated fraction part towards the most significant bit on the basis of the shift count. The adjusting circuit is connected to the shift count calculating circuit and supplied with the maximum exponent part. The adjusting circuit adjusts the maximum exponent part by using the shift count to produce an adjusted exponent part as the post-normalized exponent part.

The shift count calculating circuit has a propagation delay time. When the input cardinal number is equal to two, the propagation delay time is longer than one machine cycle but shorter than two machine cycles. Therefore, it takes a long time to carry out the post-normalization operation by the post-normalizing unit. On the other hand, the propagation delay time is shorter than one machine cycle when the input cardinal number is equal to sixteen. In this event, it takes a short time to carry out the post-normalization operation by the post-normalizing unit. However, the floating-point arithmetic circuit comprising such a post-normalizing unit cannot deal with the input data where the input cardinal number is equal to two.

SUMMARY OF THE INVENTION:

It is an object of this invention to provide a floating-point arithmetic circuit which is capable of dealing with two input data where an input cardinal number is not only equal to a first cardinal number, e.g., two but also to a second cardinal number, e.g., sixteen.

It is another object of this invention to provide a floating-point arithmetic circuit of the type described, which is capable of quickly performing floating-point arithmetic of two input data where the input cardinal number is equal to the second cardinal number.

Other objects of this invention will become clear as the description proceeds.

On describing the gist of this invention, it is possible to understand that a floating-point arithmetic circuit for performing floating-point arithmetic of first and second input data. Each of the first and the second input data is represented by a floating-point representation. The first and second input data are composed of first and second exponent parts and first and second fraction parts, respectively. Each of the first and the second exponent parts is represented by an exponent number to power of an input cardinal number. The floating-point arithmetic circuit comprises pre-normalizing means supplied with the first and the second exponent parts and the first and the second fraction parts for carrying out a pre-normalization operation on the first and the second exponent parts and the first and the second fraction parts to produce a maximum exponent part and first and second pre-normalized fraction parts. The maximum exponent part indicates a maximum of the first and the second exponent parts. The first pre-normalized fraction part is one of the first and the second fraction parts that corresponds to the maximum exponent part. The second pre-normalized fraction part is the other of the first and the second fraction parts which is given a shift equal to an absolute value of a difference between the first and the second exponent parts. Supplied with the first and the second pre-normalized fraction parts, arithmetic means carries out an arithmetic operation on the first and the second pre-normalized fraction parts to produce an operated fraction part. Supplied with the maximum exponent part and the operated fraction part, post-normalizing means carries out a post-normalization operation to produce a post-normalized exponent part and a post-normalized fraction part.

According to this invention, the above-understood floating-point arithmetic circuit is characterized in that the input cardinal number is a selected one of first and second cardinal numbers different from each other. The above-mentioned post-normalizing means comprises first shift count calculating means supplied with the operated fraction part for calculating a first shift count for use in normalizing the operated fraction part with the input cardinal number regarded as the first cardinal number. Supplied with the operated fraction part, second shift count calculating means calculates a second shift count for use in normalizing the operated fraction part with the input cardinal number regarded as the second cardinal number. Connected to the first shift count calculating means and supplied with the operated fraction part, a first shifter left-shifts the operated fraction part on the basis of the first shift count to produce a first shifted fraction part. Connected to the second shift count calculating means and supplied with the operated fraction part, a second shifter left-shifts the operated fraction part on the basis of the second shift count to produce a second shifted fraction part. Connected to the first shift count calculating means and supplied with the maximum exponent part, first adjusting means adjusts the maximum exponent part by using the first shift count to produce a first adjusted exponent part. Connected to the second shift count calculating means and supplied with the maximum exponent part, second adjusting means adjusts the maximum exponent part by using the second shift count to produce a second adjusted exponent part. Connected to the first and the second shifters, fraction selecting means selects one of the first and the second shifted fraction parts as the post-normalized fraction part. The fraction selecting means produces the first shifted fraction part as the post-normalized fraction part when the input cardinal number is the first cardinal number. The fraction selecting means produces the second shifted fraction part as the post-normalized fraction part when the input cardinal number is the second cardinal number. Connected to the first and the second adjusting means, exponent selecting means selects one of the first and the second adjusted exponent part as the post-normalized exponent part. The exponent selecting means produces the first adjusted exponent part as the post-normalized exponent part when the input cardinal number is the first cardinal number. The exponent selecting means produces the second adjusted exponent part as the post-normalized exponent part when the input cardinal number is the second cardinal number.

BRIEF DESCRIPTION OF THE DRAWING

FIG. 3 shows input data supplied to the floating-point arithmetic circuit illustrated in FIG. 2;

FIG. 4 is a block diagram of a first shift count calculating circuit for use in the floating-point arithmetic circuit illustrated in FIG. 2;

FIG. 10 is a time chart for use in describing operation of the floating-point arithmetic circuit illustrated in FIG. 2; and FIG. 11 is a time chart for use in describing another operation of the floating-point arithmetic circuit illustrated in FIG. 2.

DESCRIPTION OF THE PREFERRED EMBODIMENTS

Figure 1:
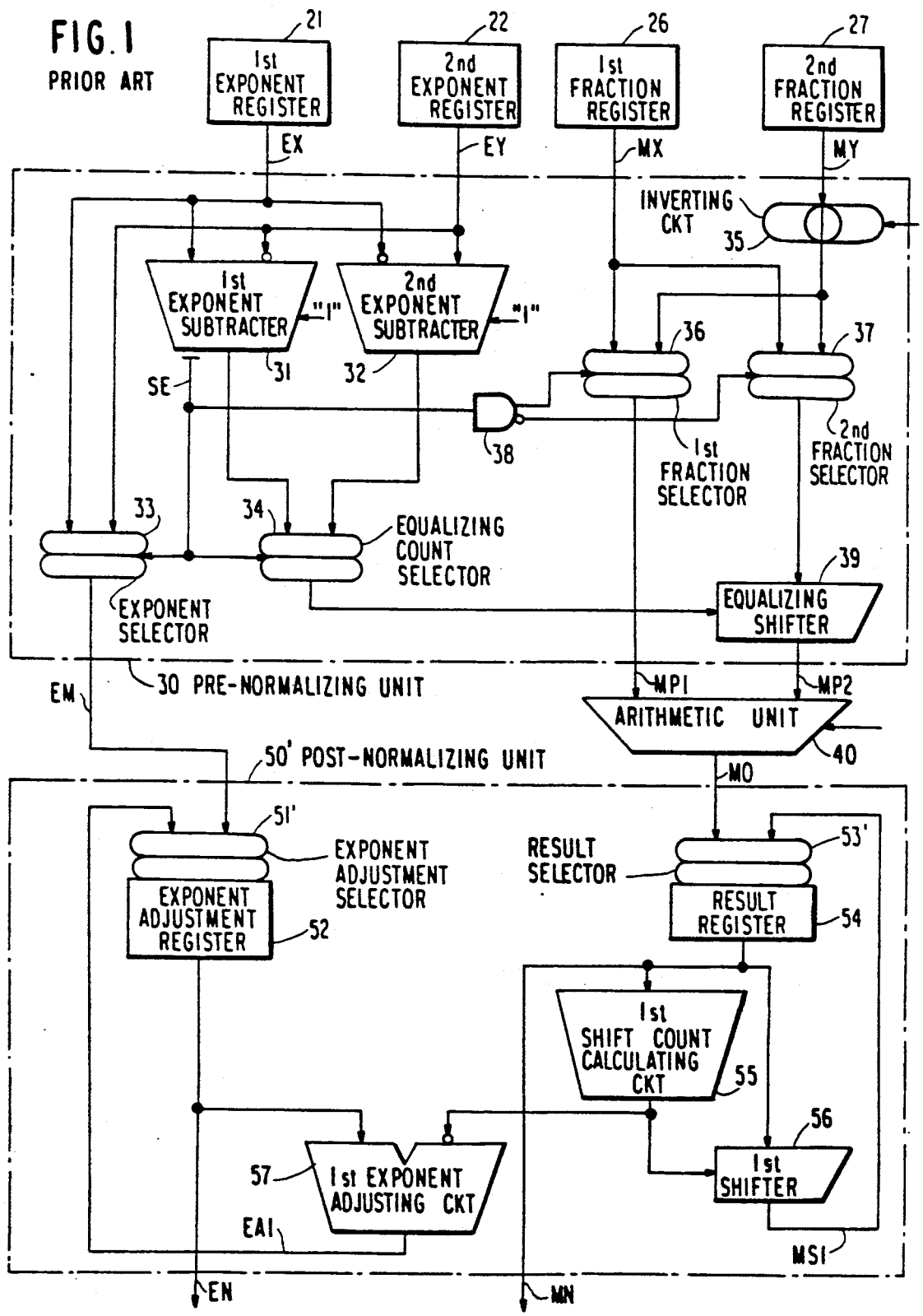
FIG. 1 is a block diagram of a conventional floating-point arithmetic circuit.

Referring to FIG. 1, a conventional floating-point arithmetic circuit will be described in order to facilitate an understanding to this invention. The floating-point arithmetic circuit is for performing floating-point arithmetic of first and second input data. Each of the first and the second input data X and Y is represented by a floating-point representation. The first and the second input data X and Y are composed of first and second exponent parts EX and EY and first and second fraction or mantissa parts MX and MY. Each of the first and the second fraction parts MX and MY has a plurality of bits arranged from a most significant bit to a least significant bit. Each of the first and the second fraction parts MX and MY is specified by a bit number in a floating point representation.

The first and the second exponent parts EX and EY are held in first and second exponent registers 21 and 22, respectively. The first and the second fraction parts MX and MY are held in first and second fraction registers 26 and 27, respectively. Each of the first and the second exponent parts EX and EY is represented by an exponent number to power of an input cardinal number. In the conventional floating-point arithmetic circuit, the input cardinal number is a cardinal number equal to two.

The floating-point arithmetic circuit comprises a pre-normalizing unit 30, an arithmetic unit 40, and a post-normalizing unit 50'.

The pre-normalizing unit 30 is supplied with the first and the second exponent parts EX and EY from the first and the second exponent registers 21 and 22 and with the first and the second fraction parts MX and MY from the first and the second fraction registers 26 and 27. The pre-normalizing unit 30 carries out a pre-normalization operation on the first and the second exponent parts EX and EY and the first and the second fraction parts EX and EY to produce a maximum exponent part EM and first and second pre-normalized fraction parts MP1 and MP2.

The maximum exponent part EM indicates a maximum of the first and the second exponent parts EX and EY. The first pre-normalized fraction part MP1 is one of the first and the second fraction parts MX and MY that corresponds to the maximum exponent part EM. The second pre-normalized fraction part MP2 is the other of the first and the second fraction parts MX and MY which is given by a shift rightward equal to an absolute value of a difference between the first and the second exponent parts EX and EY.

More specifically, the pre-normalizing unit 30 comprises first and second exponent subtracters 31 and 32 which are supplied with the first and the second exponent parts EX and EY. The first exponent subtracter 31 subtracts the second exponent part EY from the first exponent part EX to produce an exponent selection signal SE and a first subtracted exponent signal. The exponent selection signal SE is equal to a sign bit of the first subtracted exponent signal and is representative of which one of the first and the second exponent parts EX and EY is greater than the other. The second exponent subtracter 32 subtracts the first exponent part EX from the second exponent part EY to produce a second subtracted exponent signal.

An exponent selector 33 is supplied with the first and the second exponent parts EX and EY. Responsive to the exponent selection signal SE, the exponent selector 33 selects a greater one of the first and the second exponent parts EX and EY to produce the maximum exponent part EM. An equalizing count selector 34 is supplied with the first and the second subtracted exponent signals from the first and the second exponent subtracters 31 and 32. Responsive to the exponent selection signal SE, the equalized count selector 34 selects a positive one of the first and the second subtracted exponent signals to produce the absolute value of the difference between the first and the second exponent parts EX and EY. The absolute value of the difference between the exponent parts is an equalizing count necessary for equalizing the floating-point of the first and the second fraction parts MX and MY.

An inverting circuit 35 is supplied with the second fraction part MY and an inversion control signal indicative of an inversion of the second fraction part MY. The inversion control signal is supplied from a control unit (not shown). When the inversion control signal is present, the inverting circuit 35 produces, as a processed fraction part, an inverted fraction part which is obtained by inverting each bit of the second fraction part MY. When the inversion control signal is absent, the inverting circuit 35 produces, as the processed fraction part, the second fraction part MY as it is.

First and second fraction selectors 36 and 37 are supplied with the first fraction part MX and the processed fraction part. The first and the second fraction selectors 36 and 37 are controlled by a fraction selector control circuit 38. Responsive to the exponent selection signal SE, the fraction selector control circuit 38 produces first and second fraction selection signals. The first fraction selection signal is equal to the exponent selection signal SE. The second fraction selection signal is a signal obtained by inverting the exponent selection signal SE. The first and the second fraction selection signals are delivered to the first and the second fraction selectors 36 and 37, respectively.

Responsive to the first fraction selection signal, the first fraction selector 36 selects one of the first fraction part MX and the processed fraction part that corresponds to the maximum exponent part EM. Thus, the first fraction selector 36 produces a first selected fraction part as the first pre-normalized fraction part MP1.

Responsive to the second fraction selection signal, the second fraction selector 37 selects one of the first fraction part MX and the processed fraction part that corresponds to a smaller one of the first and the second exponent parts EX and EY. The second fraction selector 37 produces a second selected fraction part. Thus, the second selected fraction part corresponds to the smaller one of the first and the second exponent parts EX and EY and must be shifted so as to make the floating point of the second selected fraction part coincide with that of the first pre-normalized fraction part MP1. Otherwise, it is difficult to perform the floating-point arithmetic of the first and the second input data X and Y, as well known in the art. In this connection, the second selected fraction part is sent from the second fraction selector 37 to an equalized shifter 39 controlled by the equalized count selector 34. The equalized shifter 39 right-shifts the second selected fraction part or shifts the second selected fraction part towards the least significant bit on the basis of the equalized count supplied from the equalized count selector 34 to produce a right-shifted fraction part as the second pre-normalized fraction part MP2.

In the example being illustrated, the arithmetic unit 40 is an adder. The arithmetic unit 40 is supplied with the first and the second pre-normalized fraction parts MP1 and MP2. The arithmetic unit 40 carries out an addition operation on the first and the second pre-normalized fraction parts MP1 and MP2 to produce an operated fraction part MO. The arithmetic unit 40 is supplied from the control unit with a carry control signal necessary for subtraction.

It is to be noted that the maximum exponent part EM and the operated fraction part MO are not normalized, as known in the art. Taking this into consideration, the maximum exponent part EM and the operated fraction part MO are supplied to the post-normalizing unit 50'. The post-normalizing unit 50' carries out a post-normalization operation to produce a post-normalized exponent part EN and a post-normalized fraction part MN.

In the post-normalizing unit 50', the maximum exponent part EM is supplied through an exponent adjustment selector 51' to an exponent adjustment register 52. The exponent adjustment register 52 holds the maximum exponent part EM as a held exponent part when the exponent adjustment selector 51' selects the maximum exponent part EM as a selected exponent part. The operated fraction part MO is supplied through a result selector 53' to a result register 54. The result register 54 holds the operated fraction part MO as a held fraction part when the result selector 53' selects the operated fraction part MO as a selected fraction part.

The held fraction part is supplied to a first shift count calculating circuit 55. The first shift count calculating circuit 55 calculates a first shift count for use in normalizing the operated fraction part MO with the input cardinal number regarded as two. The first shift count is delivered to a first shifter 56 and a first exponent adjusting circuit 57. Supplied with the held fraction part, the first shifter 56 left-shifts the held fraction part or shifts the held fraction part towards the most significant bit on the basis of the first shift count to produce a first shifted fraction part MS1. The first shifted fraction part MS1 is supplied through the result selector 53' to the result register 54. The result register 54 holds the first shifted fraction part MS1 as the held fraction part when the result selector 53' selects the first shifted fraction part MS1 as the selected fraction part. The first shifted fraction part MS1 is equal to the post-normalized fraction part MN.

Supplied with the held exponent part and the first shift count, the first exponent adjusting circuit 57 adjusts the held exponent part by using the first shift count to produce a first adjusted exponent part EA1. The first adjusted exponent part EA1 is supplied through the exponent adjustment selector 51' to the exponent adjustment register 52. The exponent adjustment register 52 holds the first adjusted exponent part EA1 as the held exponent part when the exponent adjustment selector 51 selects the first adjusted exponent part EA1 as the selected exponent part. The first adjusted exponent part EA1 is equal to the post-normalized exponent part EN.

It is to be noted that, in the conventional floating-point arithmetic circuit, the input cardinal number is equal to two. The first shift count calculating circuit 55 has a propagation delay time. Inasmuch as the input cardinal number is equal to two, the propagation delay time is longer than one machine cycle but shorter than two machine cycles. Therefore, it takes a long time to carry out the post-normalization operation by the post-normalizing unit 50', as mentioned in the preamble of the instant specification.

Figure 2:
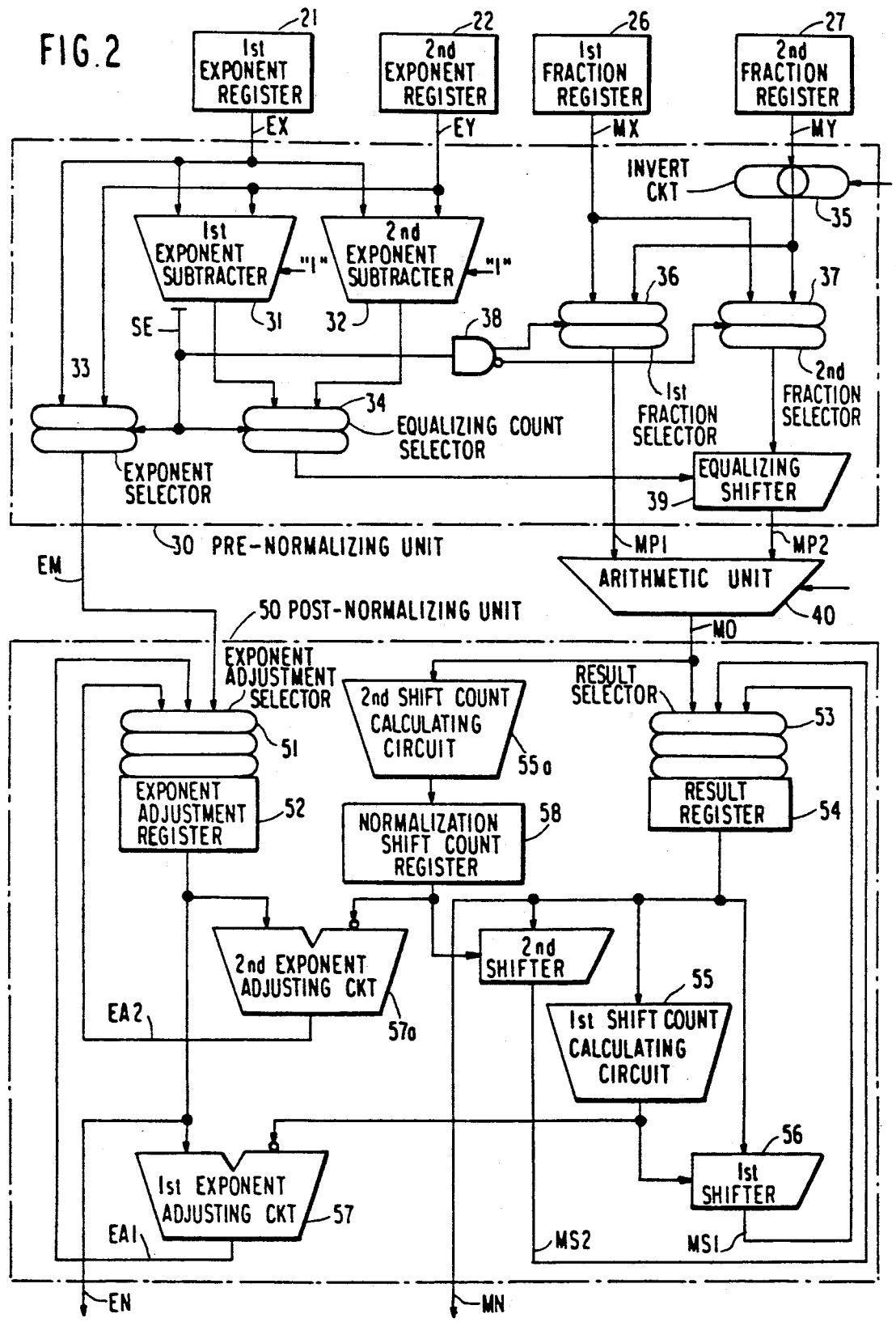
FIG. 2 is a block diagram of a floating-point arithmetic circuit according to an embodiment of this invention.

Referring to FIG. 2, a floating-point arithmetic circuit according to an embodiment of this invention is similar in structure to that illustrated in FIG. 1 except that the post-normalizing unit is modified from that illustrated in FIG. 1 as will later become clear. The post-normalizing unit is therefore depicted at 50.

The post-normalizing unit 50 is similar in structure to that illustrated in FIG. 1 except that the post-normalizing unit 50 further comprises a second shift count calculating circuit 55a, a second shifter 56a, a second exponent adjusting circuit 57a, and a normalization shift count register 58. The exponent adjustment selector and the result selector are modified from those illustrated in FIG. 1 as will later become clear. The exponent adjustment selector and the result selector are therefore depicted at 51 and 53, respectively.

It is to be noted that, in the illustrated floating-point arithmetic circuit, the input cardinal number is not only equal to two but also to a different cardinal number which is equal, e.g., to sixteen. In this connection, the post-normalizing unit 50 comprises first and second post-normalizing sections. Description will now proceed assuming that the different cardinal number is equal to sixteen. The first post-normalizing section is used in carrying out a first post-normalization operation in a case where the input cardinal number is equal to two. The second post-normalizing section is used in carrying out a second post-normalization operation in another case where the input cardinal number is equal to sixteen.

The first post-normalizing section comprises the first shift count calculating circuit 55, the first shifter 56, and the first exponent adjusting circuit 57. Likewise, the second post-normalizing section comprises the second shift count calculating circuit 55a, the second shifter 56a, and the second exponent adjusting circuit 57a.

The second shift count calculating circuit 55a is supplied with the operated fraction part MO from the arithmetic unit 40. The second shift count calculating circuit 55a calculates a second shift count for use in normalizing the operated fraction part MO with the input cardinal number regarded as sixteen. The second shift count is held in the normalization shift count register 58 as a held shift count. The held shift count is supplied to the second shifter 56a and the second exponent adjusting circuit 57a. The second shifter 56a is supplied with the held fraction part from the result register 54. The second shifter 56a left-shifts the held fraction part in accordance with the second shift count to produce a second shifted fraction part MS2. The second shifted fraction part MS2 is supplied to the result selector 53.

The result selector 53 is therefore supplied with the operated fraction part MO and the first and the second shifted fraction parts MS1 and MS2 from the arithmetic unit 40 and the first and the second shifters 56 and 56a, respectively. The result selector 53 selects one of the operated fraction part MO and the first and the second shifted fraction parts MS1 and MS2 as the selected fraction part. The selected fraction part is held in the result register 54 as the held fraction part.

The second exponent adjusting circuit 57a is supplied with the held shift count and the held exponent part from the normalization shift count register 58 and the exponent adjustment register 52, respectively. The second exponent adjusting circuit 57a adjusts the held exponent part by using the held shift count to produce a second adjusted exponent part EA2. The second adjusted exponent part EA2 is supplied to the exponent adjustment selector 51.

The exponent adjustment selector 51 is therefore supplied with the maximum exponent part EM and the first and the second adjusted exponent parts EA1 and EA2 from the exponent selector 33 and the first and the second exponent adjusting circuits 57 and 57a, respectively. The exponent adjustment selector 51 selects one of the maximum exponent part EM and the first and the second adjusted exponent parts EA1 and EA2 as the selected exponent part. The selected exponent part is held in the exponent adjustment register 52 as the held exponent part.

Temporarily referring to FIG. 3, attention is directed to the input data represented by the floating-point representation. It will be presumed that the input data consists of sixty-four bits arranged from a most significant bit numbered 0 to a least significant bit numbered 63. In this connection, the input data is composed of a sign bit SB, an exponent part EP, and a fraction or mantissa part MP. The sign bit SB is the most significant bit of the input data. The exponent part EP has a bit length equal to seven bits numbered 1 through 7. The fraction part MP has a bit length equal to fifty-six bits numbered 8 through 63.

Referring to FIG. 4, the first shift count calculating circuit 55 calculates the first shift count representative of the number of successive bits counted from a bit numbered 8. Each of the successive bits has a logic value equal to that of the sign bit SB. To this end, the first shift count calculating circuit 55 comprises first through tenth unitary circuits 61, 62, 63, 64, 65, 66, 67, 68, 69, and 70. The first through the fourth unitary circuits 61 to 64 are similar in structure to one another. The sixth through the ninth unitary circuits 66 to 69 are similar in structure to one another. The fifth, the sixth, and the tenth unitary circuits 65, 66, and 70 may alternatively be called second, third, and fourth unitary circuits depending on circumstances.

Figure 5:
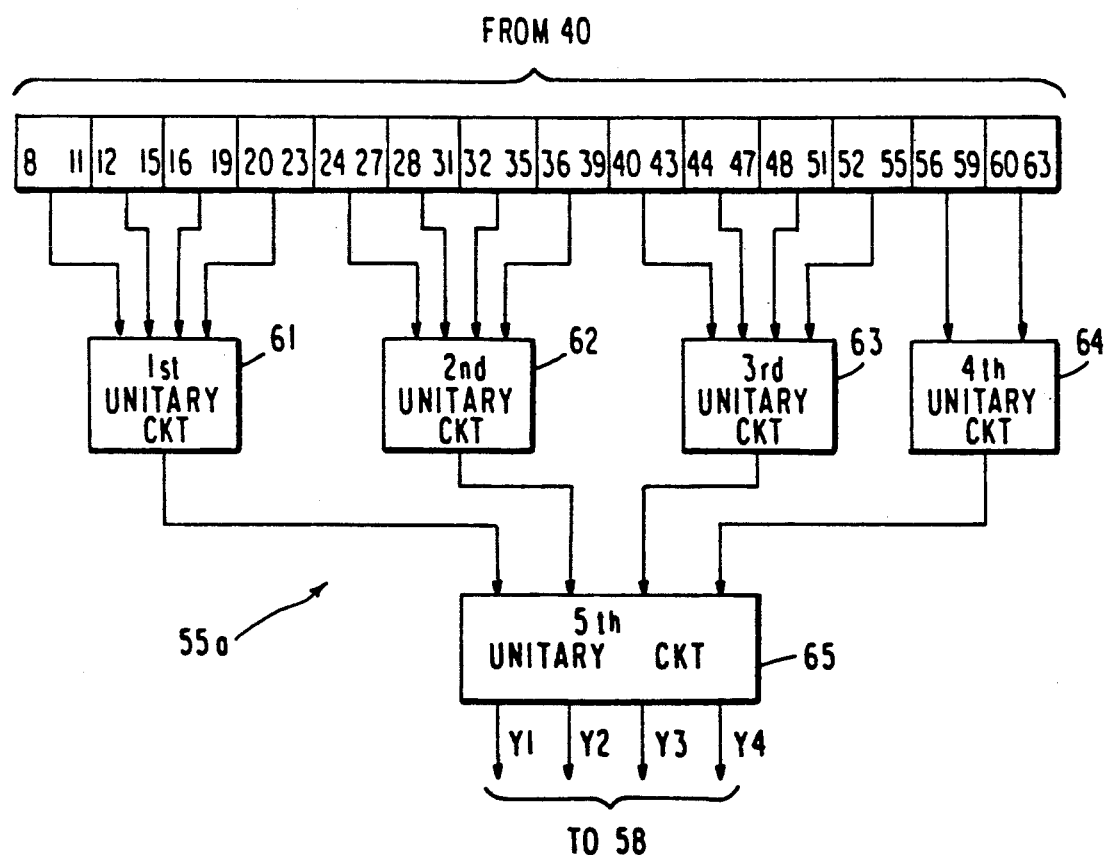
FIG. 5 is a block diagram of a second shift count calculating circuit for use in the floating-point arithmetic circuit illustrated in FIG. 2.

Referring to FIG. 5, the second shift count calculating circuit 55a calculates the second shift count representative of the number of successive bytes counted from the bit numbered 8. Each of the successive bytes has a bit pattern in which each bit has a logic value equal to the sign bit SB. Therefore, the second shift count calculating circuit 55a comprises only the first through the fifth unitary circuits 61 to 65.

Figure 6:
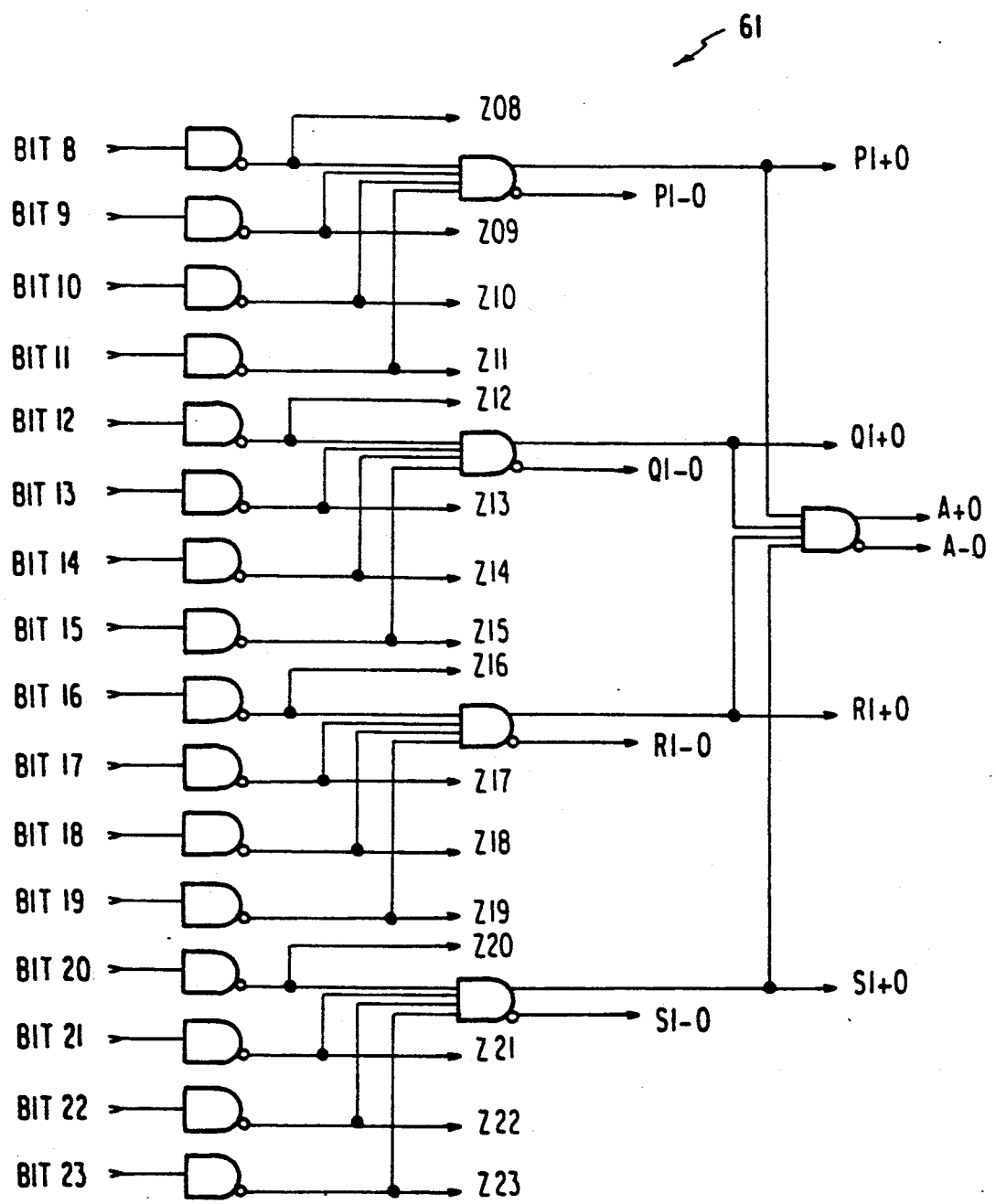
FIG. 6 is a block diagram of a first unitary circuit for use in the first and the second shift count calculating circuits illustrated in FIGS. 4 and 5.

Referring to FIG. 6, the first unitary circuit 61 comprises a plurality of gates which are twenty-one in number.

Figure 7:
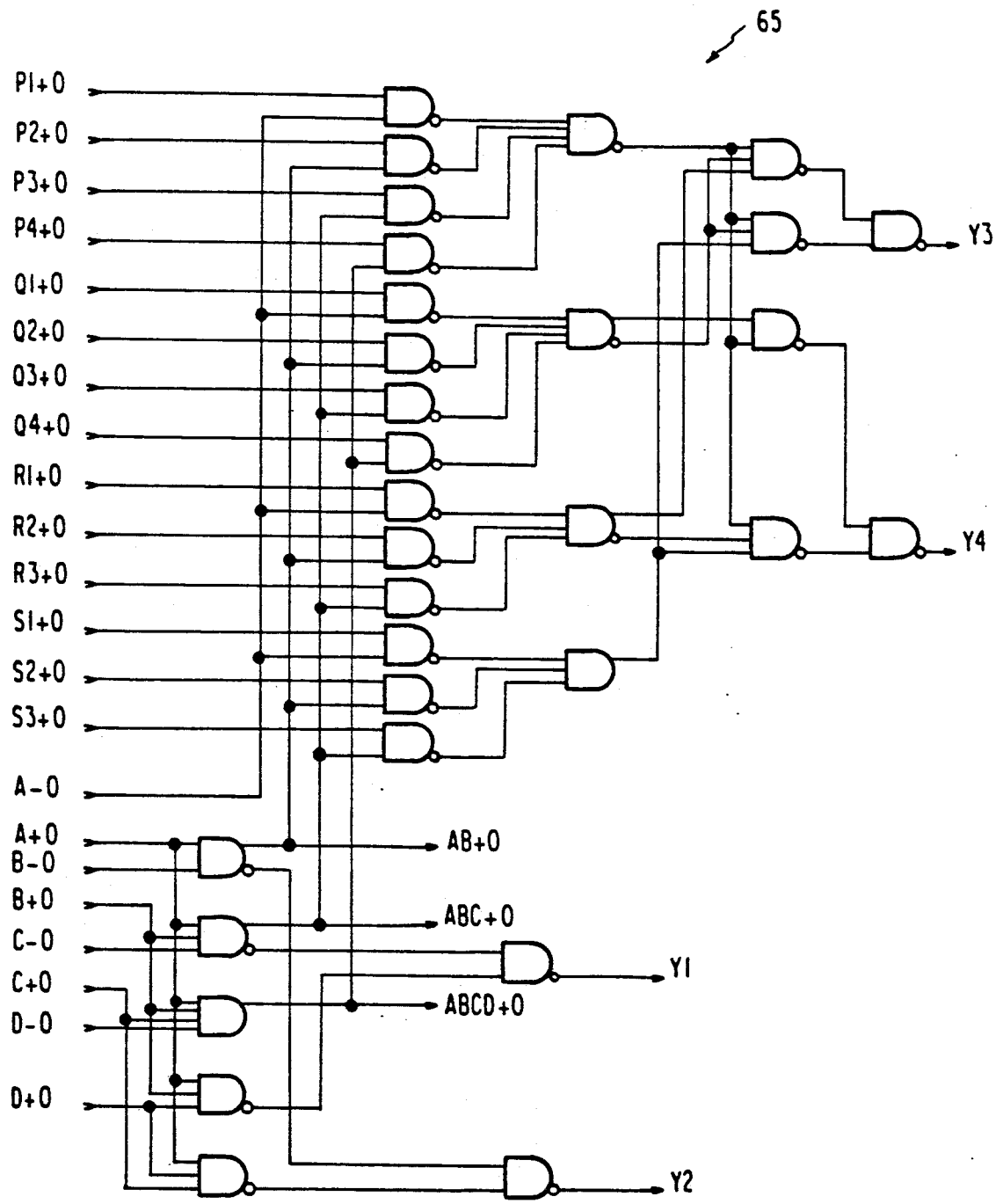
FIG. 7 is a block diagram of a fifth unitary circuit for use in the first and the second shift count calculating circuits illustrated in FIGS. 4 and 5.

Referring to FIG. 7, the fifth unitary circuit 65 comprises a plurality of gates which are thirty-one in number.

Figure 8:
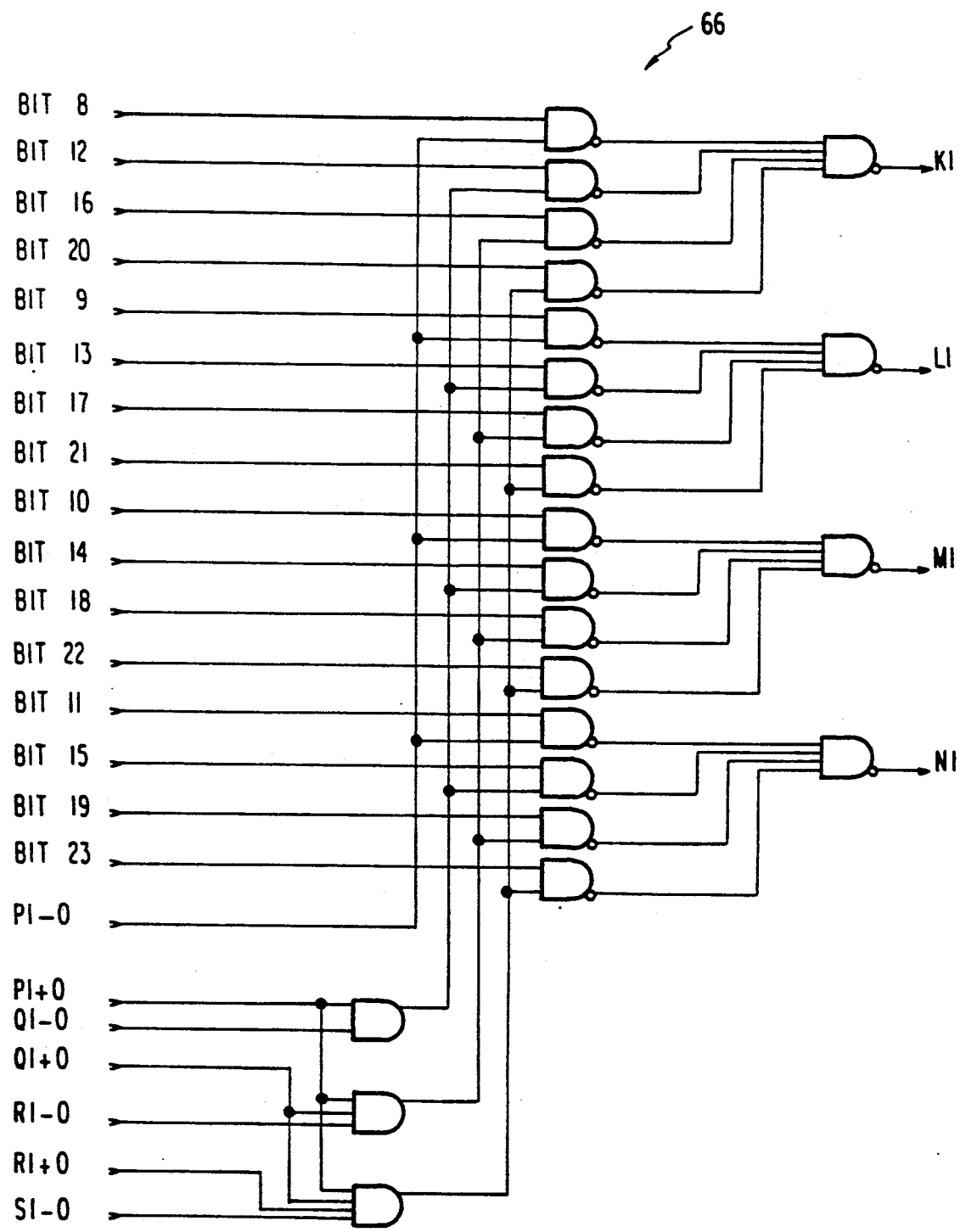
FIG. 8 is a block diagram of a sixth unitary circuit for use in the first shift count calculating circuit illustrated in FIG. 4.

Referring to FIG. 8, the sixth unitary circuit 66 comprises a plurality of gates which are twenty-three in number.

Figure 9:
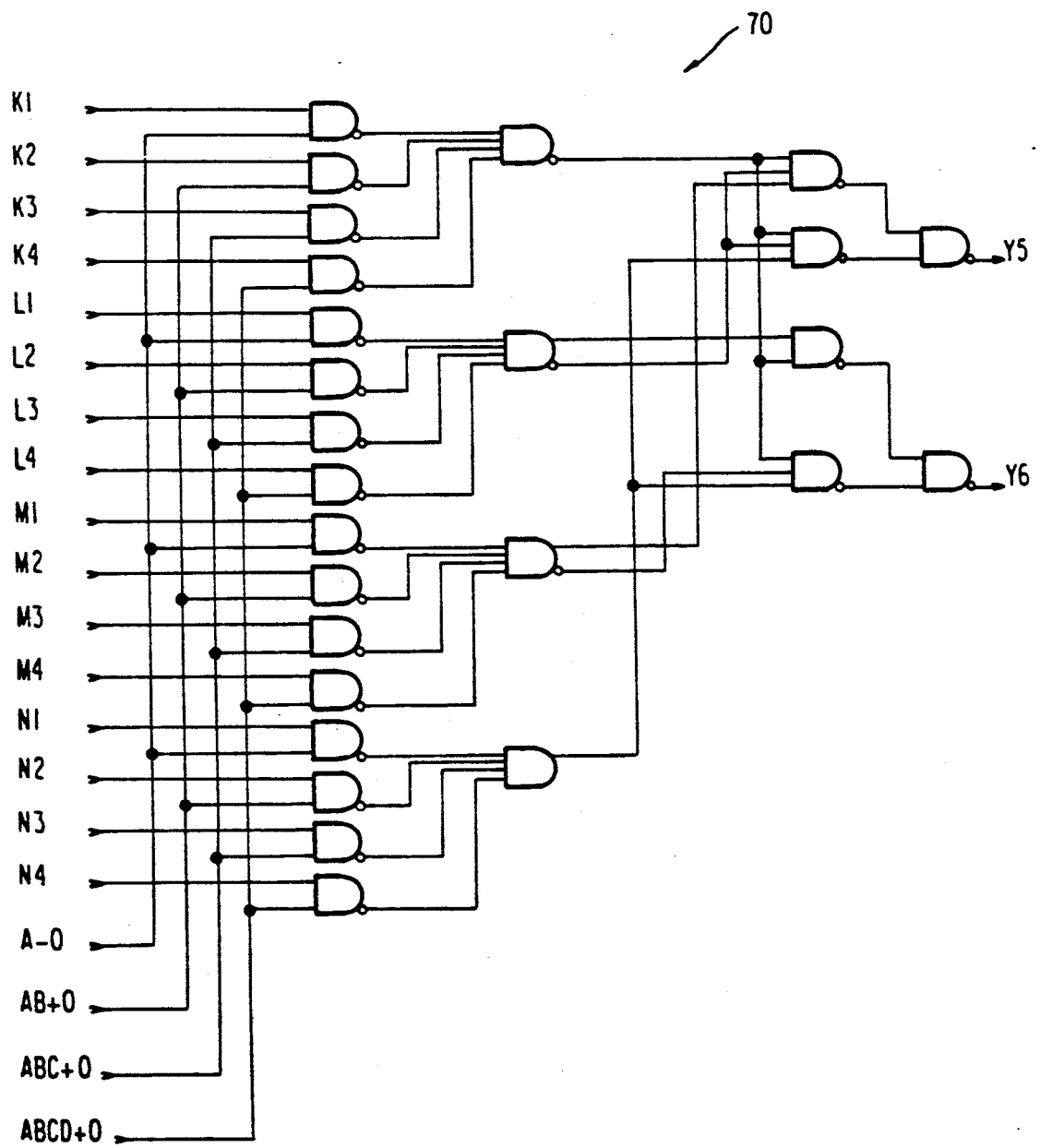
FIG. 9 is a block diagram of a tenth unitary circuit for use in the first shift count calculating circuit illustrated in FIG. 4.

Referring to FIG. 9, the tenth unitary circuit 70 comprises a plurality of gates which are twenty-six in number.

As apparent from FIGS. 4 to 9, the second shift count calculating circuit 55a comprises gates of a gate number which is equal to about a half of that of the first shift count calculating circuit 55. Therefore, the second shift count calculating circuit 55a has the propagation delay which is equal to about a half of that of the first shift count calculating circuit 55. As mentioned in preamble of the instant specification, the propagation delay time of the first shift count calculating circuit 55 is longer than one machine cycle but shorter than two machine cycles. The propagation delay time of the second shift count calculating circuit 55a is shorter than one machine cycle.

Referring to FIG. 10, the description will proceed to operation of the floating-point arithmetic circuit illustrated in FIG. 2 in a case where the input cardinal number is equal to two. First through fifth machine cycles are indicated along a first or top line in FIG. 10 by T1 through T5.

In the first and the second machine cycles represented by T1 and T2, the first and the second fraction part MX and MY are held in the first and the second fraction registers 26 and 27, respectively, in the manner depicted along a second line from the top. The pre-normalizing unit 30 carries out the pre-normalization operation on the first and the second fraction part MX and MY to produce the first and the second pre-normalized fraction parts MP1 and MP2. The arithmetic unit 40 carries out the addition operation on the first and the second pre-normalized fraction parts MP1 and MP2 to produce the operated fraction part MO in the manner depicted along a third line from the top. The result selector 53 selects the operated fraction part MO as the selected fraction part in the manner depicted along a fourth line from the top. On the other hand, the first and the second exponent parts EX and EY are held in the first and the second exponent registers 21 and 22, respectively, in the manner depicted along a seventh line from the top. The exponent selector 33 of the pre-normalizing unit 30 produces the maximum exponent part EM. The exponent adjustment selector 51 selects the maximum exponent part EM as the selected exponent part in the manner depicted along an eighth line from the top.

In the third and the fourth machine cycles represented by T3 and T4, the result register 54 holds the selected fraction part or the operated fraction part MO as the held fraction part in the manner depicted along a fifth line from the top. The first shift count calculating circuit 55 calculates the first shift count for use in normalizing the held fraction part. The first shifter 56 left-shifts the held fraction part on the basis of the first shift count to produce the first shifted fraction part MS1 in the manner depicted along a sixth line from the top. The result selector 53 selects the first shifted fraction part MS1 as the selected fraction part. On the other hand, the exponent adjustment register 52 holds the selected exponent part or the maximum exponent part EM as the held exponent part in the manner depicted along a ninth line from the top. The first exponent adjusting circuit 57 adjusts the held exponent part by using the first shift count to produce the first adjusted exponent part EA1 in the manner depicted along a tenth line from the top. The exponent adjustment selector 51 selects the first adjusted exponent part EA1 as the selected exponent part.

In the fifth machine cycle represented by T5, the result register 54 holds the selected fraction part or the first shifted fraction part MS1 as the held fraction part. The exponent adjustment register 52 holds the selected exponent part or the first adjusted exponent part EA1 as the held exponent part. The held fraction part or the first shifted fraction part MS1 is produced as the post-normalized fraction part MN. The held exponent part or the first adjusted exponent part EA1 is produced as the post-normalized exponent part EN.

As apparent from FIG. 10, it takes two machine cycles to obtain the post-normalized fraction part MN and the post-normalized exponent part EN by the post-normalizing unit 50 when the input cardinal number is equal to two.

Referring to FIG. 11, the description will proceed to another operation of the floating-point arithmetic circuit illustrated in FIG. 2 in another case where the input cardinal number is equal to sixteen. First through fifth machine cycles are indicated along a first or top line in FIG. 11 by T1 through T5.

In the first and the second machine cycles represented by T1 and T2, the first and the second fraction part MX and MY are held in the first and the second fraction registers 26 and 27, respectively, in the manner depicted along a second line from the top. The pre-normalizing unit 30 carries out the pre-normalization operation on the first and the second fraction part MX and MY to produce the first and the second pre-normalized fraction parts MP1 and MP2. The arithmetic unit 40 carries out the addition operation on the first and the second pre-normalized fraction parts MP1 and MP2 to produce the operated fraction part MO in the manner depicted along a third line from the top. The result selector 53 selects the operated fraction part MO as the selected fraction part in the manner depicted along a fourth line from the top. The second shift count calculating circuit 55a calculates the second shift count for use in normalizing the operated fraction part MO. On the other hand, the first and the second exponent parts EX and EY are held in the first and the second exponent registers 21 and 22, respectively, in the manner depicted along a seventh line from the top. The exponent selector 33 of the pre-normalizing unit 30 produces the maximum exponent part EM. The exponent adjustment selector 51 selects the maximum exponent part EM as the selected exponent part in the manner depicted along an eighth line from the top.

In the third machine cycles represented by T3, the result register 54 holds the selected fraction part or the operated fraction part MO as the held fraction part in the manner depicted along a fifth line from the top. The second shift count is held in the normalization shift count register 58 as the held shift count. The second shifter 56a left-shifts the held fraction part on the basis of the held shift count to produce the second shifted fraction part MS2 in the manner depicted along a sixth line from the top. The result selector 53 selects the second shifted fraction part MS2 as the selected fraction part. On the other hand, the exponent adjustment register 52 holds the selected exponent part or the maximum exponent part EM as the held exponent part in the manner depicted along a ninth line from the top. The second exponent adjusting circuit 57a adjusts the held exponent part by using the held shift count to produce the second adjusted exponent part EA2 in the manner depicted along a tenth line from the top. The exponent adjustment selector 52 selects the second adjusted exponent part EA2 as the selected exponent part.

In the fourth machine cycle represented by T4, the result register 54 holds the selected fraction part or the second shifted fraction part MS2 as the held fraction part. The exponent adjustment register 52 holds the selected exponent part or the second adjusted exponent part EA2 as the held exponent part. The held fraction part of the second shifted fraction part MS2 is produced as the post-normalized fraction part MN. The held exponent part or the second adjusted exponent part EA2 is produced as the post-normalized exponent part EN.

As apparent from FIG. 11, it takes one machine cycles to obtain the post-normalized fraction part MN and the post-normalized exponent part EN by the post-normalizing unit 50 when the input cardinal number is equal to sixteen.

While this invention has thus far been described in connection with only one preferred embodiment thereof, it will now readily be possible for one skilled in the art to develop various other embodiments of this invention. For example, the different cardinal number may be four, eight, thirty-two, or the like. The cardinal number described in the prior art is not restricted according to this invention to two alone but may be one of the numbers exemplified above as the different cardinal number and is smaller than the different cardinal number. In this connection, the cardinal number described in the prior art and the different cardinal number may be called first and second cardinal numbers, respectively.

What is claimed is:

1. In a floating-point arithmetic circuit for performing floating-point arithmetic of first and second input data represented by a floating-point representation and composed of first and second exponent parts and first and second fraction parts, each of said first and said second exponent parts being represented by an exponent number to power of an input cardinal number, said floating-point arithmetic circuit comprising pre-normalizing means supplied with said first and said second exponent parts and said first and said second fraction parts for carrying out a pre-normalization operation on said first and said second exponent parts and said first and said second fraction parts to produce a maximum exponent part and first and second pre-normalized fraction parts, said maximum exponent part indicating a maximum of said first and said second exponent parts, said first pre-normalized fraction part being one of said first and said second fraction parts that corresponds to said maximum exponent parts, said second pre-normalized fraction part being the other of said first and said second fraction parts which is given a shift equal to an absolute value of a difference between said first and said second exponent parts, arithmetic means supplied with said first and said second pre-normalized fraction parts for carrying out an arithmetic operation on said first and said second pre-normalized fraction parts to produce an operated fraction part, and post-normalizing means supplied with said maximum exponent part and said operation fraction part for carrying out a post-normalization operation to produce a post-normalized exponent part and a post-normalized fraction part, the improvement wherein:

said input cardinal number is a selected one of first and second cardinal numbers different from each other;

said post-normalizing means comprising:

first shift count calculating means supplied with said operated fraction part for calculating a first shift count for use in normalizing said operated fraction part with said input cardinal number regarded as said first cardinal number;

second shift count calculating means supplied with said operated fraction part for calculating a second shift count for use in normalizing said operated fraction part with said input cardinal number regarded as said second cardinal number;

a first shifter connected to said first shift count calculating means and supplied with said operated fraction part for left-shifting said operated fraction part on the basis of said first shift count to produce a first shifted fraction part;

a second shifter connected to said second shift count calculating means and supplied with said operated fraction part for left-shifting said operated fraction part on the basis of said second shift count to produce a second shifted fraction part;

first adjusting means connected to said first shift count calculating means and supplied with said maximum exponent part for adjusting said maximum exponent part by using said first shift count to produce a first adjusted exponent part;

second adjusting means connected to said second shift count calculating means and supplied with said maximum exponent part for adjusting said maximum exponent part by using said second shift count to produce a second adjusted exponent part;

fraction selecting means connected to said first and said second shifter for selecting one of said first and said second shifted fraction parts as said post-normalized fraction part, said fraction selecting means producing said first shifted fraction part as said post-normalized fraction part when said input cardinal number is said first cardinal number, said fraction selecting means producing said second shifted fraction part as said post-normalized fraction part when said input cardinal number is said second cardinal number; and exponent selecting means connected to said first and said second adjusting means for selecting one of said first and said second adjusted exponent part as said post-normalized exponent part, said exponent selecting means producing said first adjusted exponent part as said post-normalized exponent part when said input cardinal number is said first cardinal number, said exponent selecting means producing said second adjusted exponent part as said post-normalized exponent part when said input cardinal number is said second cardinal number.

2. A floating-point arithmetic circuit as claimed in claim 1, wherein said first and said second cardinal numbers are equal to two and sixteen, respectively.

* * * * *

UNITED STATES PATENT AND TRADEMARK OFFICE
CERTIFICATE OF CORRECTION

PATENT NO. : 5,075,882

DATED : December 24, 1991

INVENTOR(S) : Noriaki SAKAI and Hiroyuki ARII

It is certified that error appears in the above-identified patent and that said Letters Patent is hereby corrected as shown below:

On the title page, in item [54] and in column 1, line 3,
in the Title, after "TWO INPUT DATA" insert --WHERE AN INPUT CARDINAL NUMBER IS NOT ONLY EQUAL TO A FIRST CARDINAL NUMBER BUT ALSO TO A SECOND CARDINAL NUMBER--

Signed and Sealed this

Ninth Day of November, 1993

*Attest:*

BRUCE LEHMAN

*Attesting Officer*    *Commissioner of Patents and Trademarks*